Jan. 9, 1934.　　　　U. A. WHITAKER　　　　1,942,503
QUICK RELEASE DEVICE
Original Filed Dec. 10, 1928
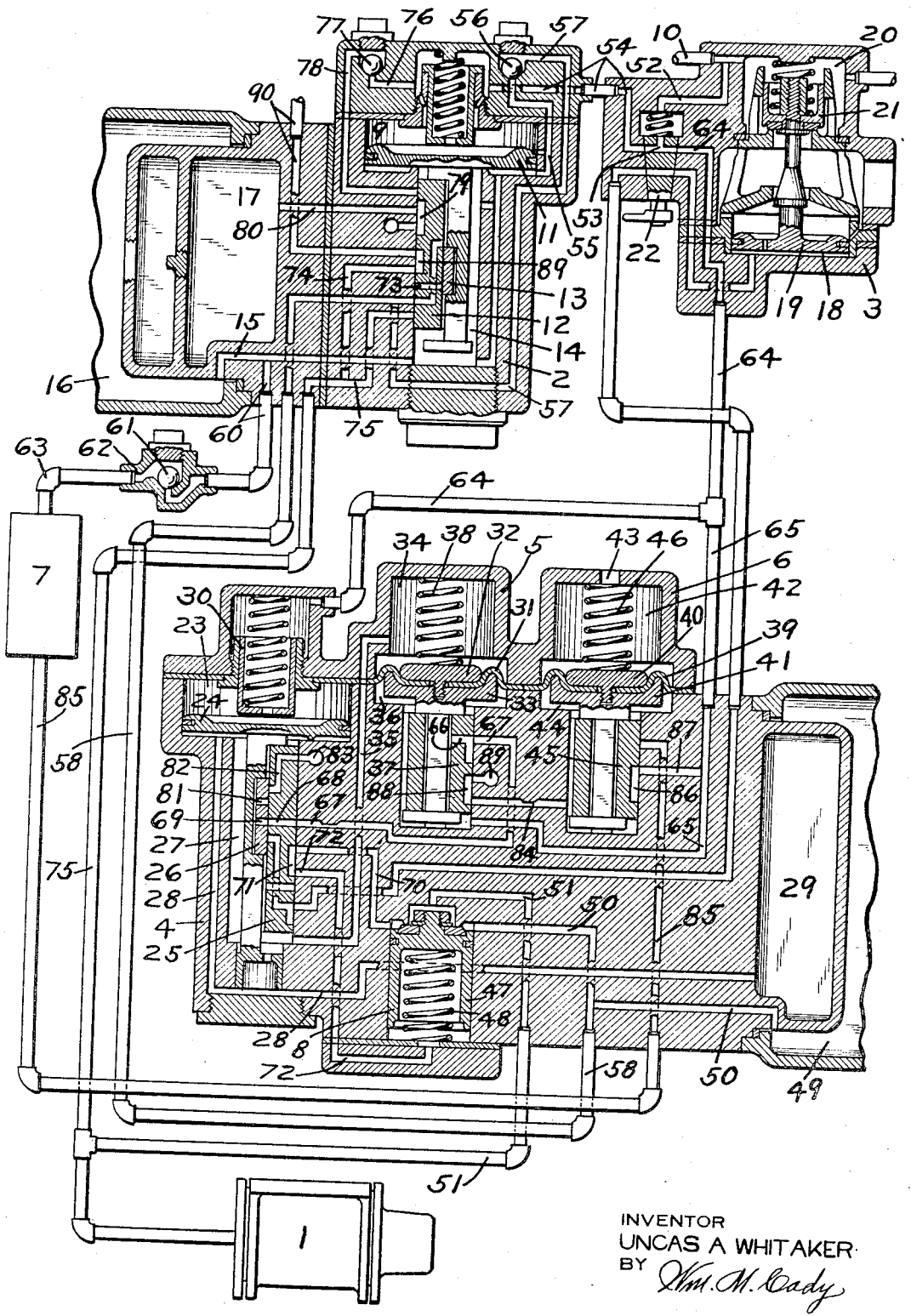
INVENTOR
UNCAS A WHITAKER
BY
Wm. M. Cady
ATTORNEY Patented Jan. 9, 1934

1,942,503

UNITED STATES PATENT OFFICE 1,942,503

QUICK RELEASE DEVICE

Uncas A. Whitaker, Canton, Ohio, assignor to The Westinghouse Air Brake Company, Wilmerding, Pa., a corporation of Pennsylvania Application December 10, 1928, Serial No. 324,889
Renewed February 2, 1933

24 Claims. (Cl. 303—66)

This invention relates to fluid pressure brakes and has for its principal object the provision of novel means for insuring the prompt release of the brakes on a train.

Another object of my invention is to provide a fluid pressure brake equipment having improved means for insuring the prompt release of the brakes on a train only when said release is intentionally initiated.

Other objects and advantages will appear in the following more detailed description of the invention.

In the accompanying drawing, the single figure is a diagrammatic view, mainly in section, of a fluid pressure brake equipment embodying my invention.

As shown in the drawing, the equipment may comprise a brake cylinder 1, a service application valve device 2, a quick action valve device 3, an emergency valve device 4, a quick release control valve device 5, a quick release valve device 6, a quick release reservoir 7 and a high pressure valve device 8.

The service application valve device 2 may comprise a casing having a piston chamber 9 connected to a brake pipe 10 through passage and pipe 54, a port 53 in a cut out cock 22 and a passage 52, and containing a piston 11, a main slide valve 12 and an auxiliary slide valve 13 operable by the piston 11 and contained in a valve chamber 14, which is connected by a passage 15 to an auxiliary reservoir 16 formed in the casing. Also formed in the casing is a quick service chamber 17.

The quick action valve device 3 may comprise a casing having a piston chamber 18 containing a quick action piston 19, and also having a valve chamber 20 containing a valve 21 operatively connected to the piston 19, said chamber 20 being open to the brake pipe 10. Also contained in the quick action valve device casing is a manually operated cut-out cock 22, which is adapted to control communication through the passages by which fluid under pressure is supplied to piston chamber 18 and also to the service and emergency application valve devices 2 and 4 respectively.

The emergency application valve device 4 may comprise a casing, having a piston chamber 23 connected to the brake pipe 10 and containing a piston 24, which is adapted to operate a main slide valve 25 and an auxiliary slide valve 26 contained in a valve chamber 27 connected by a passage 28 to a quick action chamber 29. A spring pressed stop 30 is provided in the casing and functions to define the service position of the piston 24.

The quick release control valve device 5 may comprise a casing in which there is mounted a flexible diaphragm 31. This diaphragm is clamped between connected follower members 32 and 33, the follower member 32 being contained in a chamber 34, which is connected to the valve chamber 27 of the emergency valve device through a passage 35 and the follower member 33 being contained in a valve chamber 36 which is connected to the brake pipe 10. Contained in the chamber 36 and operable by the diaphragm and follower member 33 is a slide valve 37. Contained in the chamber 34 and interposed between the casing and the follower 32 is a spring 38 which exerts a downward pressure on the diaphragm 31.

The quick release valve device 6 may comprise a casing in which there is mounted a flexible diaphragm 39. This diaphragm is clamped between connected follower members 40 and 41, the follower member 40 being contained in a chamber 42 which is connected to atmosphere through a passage 43, and the follower member 41 being in a valve chamber 44 and adapted to contained operate a slide valve 45 also contained in this chamber. Contained in the chamber 42 and interposed between the follower member 40 and the casing is a spring 46 which exerts downward pressure on the diaphragm 39.

The high pressure valve device 8 may comprise a valve piston 47 subject on one side to the pressure of a coil spring 48, on the outer seated area of the opposite side, to the pressure of fluid in an emergency reservoir 49, as supplied through a passage 50, and on the inner seated area to the pressure of fluid in the brake cylinder 1 as supplied through pipe and passage 51.

In operation, fluid under pressure from the brake pipe 10 flows through a passage 52, port 53 in cut-out cock 22, passages and pipe 54 to the piston chamber 9 of the service application valve device 2, forcing the piston 11 to its innermost position as shown in the drawing. From piston chamber 9, fluid flows through a short branch passage leading from the chamber 9 to the passage 55 and through passage 55 to valve chamber 14 and from thence through passage 15 to the auxiliary reservoir 16, charging the same. Fluid from the piston chamber 9 also flows through passage 55, past a ball check valve 56, then through passage 57, pipe 58 and passage 50, to the emergency reservoir 49, charging the same.

Fluid under pressure flowing through passage 15 to the auxiliary reservoir 16 also flows to the quick release reservoir 7 through a passage and pipe 60, past a ball check valve 61 contained in a check valve device 62 and then through pipe 63, thus charging the quick release reservoir.

Fluid under pressure from the brake pipe 10 is also supplied through passage 52, port 53 in the cut-out cock 22, passage and pipe 64 to the piston chamber 23 of the emergency valve device 4, where it acts to shift the piston 24 to its innermost position as shown in the drawing.

From the pipe 64 fluid under pressure is supplied through pipe and passage 65 to the valve chamber 36 of the quick release control valve device 5, and from thence flows through a port 66 in the slide valve 37, a restricted passage 67, ports 68 and 69 in the slide valves 25 and 26 respectively of the emergency valve device to the valve chamber 27. From the chamber 27 fluid under pressure flows through the passage 35 to the chamber 34 of the quick release control valve device 5 and since the pressures on both sides of the diaphragm 31 are equal, the pressure of the spring 38 maintains the diaphragm, follower members and slide valve 37 in their innermost positions as shown in the drawing.

From the valve chamber 27 fluid under pressure also flows through passage 28 to the quick action chamber 29, charging the same.

Fluid from the emergency reservoir 49 is supplied through passage 50 to the outer seated area of the high pressure valve piston 47 and from thence, when the emergency piston 24 and slide valve 25 are in release position as shown in the drawing, to spring side of the valve piston through a passage 70, a cavity 71 in the slide valve 25 and passage 72, the pressure of fluid thus supplied, together with the pressure of the spring 48 acts to seat the valve piston 47.

When it is desired to effect a service application of the brakes, the pressure of fluid in the brake pipe 10 and consequently in the piston chamber 9 of the service valve device 2, is reduced in the usual manner. The reduction of pressure in piston chamber 9 permits the piston 11 and slide valves 12 and 13 to be shifted, by the pressure of fluid in valve chamber 14, to service position.

With the valve device 2 in service position, the usual service port 73 is uncovered and registers with a passage 74 so that fluid under pressure from the auxiliary reservoir 16 is supplied to the brake cylinder 1 through passage 15, valve chamber 14, port 73 in the slide valve, passage 74 and a passage and pipe 75.

With the slide valve 12 in service position, fluid under pressure from the piston chamber 9 and brake pipe 10 is vented into the quick service chamber 17 through a passage 76, past a ball check valve 77, through a passage 78, a cavity 79 in the slide valve 12 and passage 80 so as to effect a rapid local reduction in brake pipe pressure and cause the rapid propagation of the quick service action throughout the train.

The reduction of brake pipe pressure at a service rate permits the piston 24 of the emergency valve to be shifted outwardly until it comes to a stop against the spring pressed stop 30. This movement of the piston 24 causes the slide valve 25 to be shifted to its service position, in which the valve chamber 27 together with the connected quick action chamber 29 is vented to atmosphere by way of a port 81 in the slide valve 26, a port 82 in the slide valve 25 and an atmospheric passage 83. Now when the pressure of fluid in the valve chamber 27 and quick action chamber 29 has been reduced slightly below the pressure of fluid from the brake pipe 10 and piston chamber 23, the higher pressure in chamber 23, acting on the piston 24, will shift said piston and slide valve 26 again to their release positions so that upon effecting a reduction in brake pipe pressure at a service rate, the emergency valve device will not operate to effect an emergency application of the brakes.

When it is desired to release the brakes, the brake pipe pressure is increased in the usual way which causes the pressure of fluid in the piston chamber 9 of the service application valve device to be correspondingly increased, causing the piston 11 and slide valves 12 and 13 to be shifted to their innermost or release positions, in which fluid under pressure in the brake cylinder 1 is vented to atmosphere by way of pipe and passage 75, passage 74, a cavity 89 in the slide valve 12 and passage and pipe 90.

When the brake pipe pressure is thus increased, the pressure of fluid in the valve chamber 36 of the quick release control valve device 5 will be correspondingly increased by the supply of fluid under pressure from the brake pipe 10 by way of passage 52, port 53 in the cut-out cock 22, passage and pipe 64, and pipe and passage 65.

As hereinbefore described in connection with the charging of the system, fluid under pressure supplied to the valve chamber 36 of the control valve device will be supplied to the chamber 34 thereof by way of port 66 in the slide valve 37, passage 67, ports 68 and 69 of the emergency valve device 4, valve chamber 27 and passage 35. Since the passage 67 is restricted the flow of fluid under pressure to the chamber will be at a slower rate than the flow to the valve chamber 36, so that a higher pressure in the valve chamber 36 is more quickly built up than can an equal pressure be built up in chamber 34. This higher pressure in valve chamber 36, acting on one side of the diaphragm 31, against the pressure of fluid and spring 38 in chamber 34 acting on the other side of the diaphragm, causes the diaphragm to move outwardly carrying with it the follower member 33 and slide valve 37 to their outer or release positions.

With the slide valve 37 in this position the chamber 34 continues to be supplied with fluid under pressure from the valve chamber 36 in the same manner as hereinbefore described. Further with the slide valve 37 in this position fluid under pressure from the valve chamber 36 is supplied to the valve chamber 44 of the quick release valve device 6, through a restricted passage 84. Fluid under pressure thus supplied to the chamber 44, acting on one side of the flexible diaphragm 39 causes said diaphragm to move outwardly, against the pressure of the spring 46, carrying with it the slide valve 45 to its outer or release position. With the slide valve 45 in this position fluid under pressure from the quick release reservoir 7 is supplied to the brake pipe 10 through a pipe and passage 85, cavity 86 in the slide valve 45 of the quick release valve device 6, a passage 87, passage and pipe 65, pipe and passage 64, port 53 in the cut-out cock 22 and passage 52, thus rapidly increasing the brake pipe pressure which acts to hasten the releasing action of the application valve device on the next succeeding car, as well as hasten the action of the quick release valve devices 5 and 6 on this next car to further supply fluid under pressure from its reservoir 7 to the brake pipe 10.

It will thus be seen that as each reservoir 7 is discharged into the brake pipe, the pressure in the brake pipe is rapidly increased throughout the train, so that the application valve devices will operate promptly to their release positions, thereby effecting a rapid release of the brakes throughout the train.

When the pressure of fluid in the chamber 34 of the quick release control valve device 5 becomes substantially equal to the pressure of fluid in the valve chamber 36, the pressure of the spring 38 causes the diaphragm 31 to operate to shift the follower member 33 and slide valve 37 to their innermost or normal positions as shown in the drawing. With the slide valve 37 in this position fluid under pressure will continue to be supplied to the valve chamber 27 of the emergency valve device 4 and to the chamber 34 as described. Further with the slide valve 37 in its normal position, the valve chamber 44, of the quick release valve device 6, will be vented to the atmosphere by way of passage 84, a cavity 88 in the slide valve 37 of the valve device 5 and an atmospheric passage 89.

With the valve chamber 44 of the valve device 6 thus vented, the pressure of the spring 46 causes the diaphragm 39 to operate to shift the follower member 41 and slide valve 45 to their innermost or normal positions in which the passage 85 is lapped, thus closing off the further supply of fluid under pressure from the quick release reservoir 7 to the brake pipe 10.

When releasing the brakes after an emergency application, the quick release control valve device 5 and the quick release valve device 6 will operate to propagate the rapid release of the brakes throughout the train in substantially the same manner as has just been described in connection with the release of the brakes after a service application.

Since the quick release control valve device 5 is subject to the opposing pressure of fluid in the brake pipe 10 and the pressure of fluid from the quick action chamber, supplied through the operation of emergency valve device 4, and the operation of the quick release valve device 6 is controlled by the operation of the valve device 5, leakage of fluid under pressure from the service reservoir 16 which may be great enough to permit the service application valve device to operate to release position and vent the brake cylinder 1 to atmosphere, will not cause the valve devices 5 and 6 to operate to supply fluid under pressure from the quick service reservoir 7 to the brake pipe 10, thus preventing the propagation of unintentional serial release action throughout the train.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid pressure brake, the combination with a brake pipe, of two reservoirs normally charged with fluid under pressure from said brake pipe, a valve device operative upon a reduction in brake pipe pressure in effecting an application of the brakes for venting fluid under pressure from one of said reservoirs to atmosphere to reduce the pressure of fluid in said reservoir, and means operative upon an increase in brake pipe pressure in releasing the brakes, subject to the reduced pressure in said reservoir and brake pipe pressure for controlling the supply of fluid under pressure from the other of said reservoirs to said brake pipe.

2. In a fluid pressure brake, the combination with a brake pipe, of two reservoirs normally charged with fluid under pressure from said brake pipe, a valve device operative upon a reduction in brake pipe pressure in effecting an application of the brakes for venting fluid under pressure from one of said reservoirs to atmosphere to reduce the pressure of fluid in said reservoir, and valve means operative upon an increase in brake pipe pressure in releasing the brakes, subject to the reduced pressure in said reservoir and brake pipe pressure for controlling the supply of fluid under pressure from the other of said reservoirs to said brake pipe.

3. In a fluid pressure brake, the combination with a brake pipe, of two reservoirs normally charged with fluid under pressure from said brake pipe, a valve device operative upon a reduction in brake pipe pressure in effecting an application of the brakes for venting fluid under pressure from one of said reservoirs to atmosphere to reduce the pressure of fluid in said reservoir, a valve device operative to establish communication through which fluid under pressure is supplied from the other of said reservoirs to said brake pipe, and means operative upon an increase in brake pipe pressure in releasing the brakes, subject to the reduced pressure in said reservoir and brake pipe pressure for supplying fluid under pressure to operate the second mentioned valve device for supplying fluid under pressure to the brake pipe.

4. In a fluid pressure brake, the combination with a brake pipe, of means subject to the pressure of fluid in said brake pipe for releasing the brakes, and means subject to the pressure of fluid in said brake pipe for increasing the pressure of fluid in the brake pipe in releasing the brakes, the last mentioned means comprising two operatively connected valve devices.

5. In a fluid pressure brake, the combination with a brake pipe, of means subject to the pressure of fluid in said brake pipe for releasing the brakes, and means subject to the pressure of fluid in said brake pipe for increasing the pressure of fluid in the brake pipe in releasing the brakes, the last mentioned means comprising a valve device for supplying fluid under pressure to the brake pipe, and a valve device for controlling the operation of the first mentioned valve device.

6. In a fluid pressure brake, the combination with a brake pipe, of a valve device operative by fluid under pressure from said brake pipe for releasing the brakes, a valve device operative to supply fluid under pressure to said brake pipe in releasing the brakes, and a valve device operative by fluid under pressure from said brake pipe for controlling the operation of the second mentioned valve device.

7. In a fluid pressure brake, the combination with a brake pipe, of a valve device operative by fluid under pressure from said brake pipe for releasing the brakes, a valve device operative to supply fluid under pressure to said brake pipe in releasing the brakes, and a valve device operative by fluid under pressure from said brake pipe for supplying fluid under pressure from said brake pipe to the second mentioned valve device to cause the second mentioned valve device to operate to supply fluid under pressure to the brake pipe.

8. In a fluid pressure brake, the combination with a brake pipe, of an application valve device operative upon an increase in brake pipe pressure to release the brakes, a reservoir normally charged with fluid under pressure from said brake pipe, and two valve devices operative upon an increase in brake pipe pressure in releasing the brakes for establishing communication through which fluid under pressure is supplied from said reservoir to said brake pipe, and for controlling the supply of fluid from the reservoir to the brake pipe.

9. In a fluid pressure brake, the combination with a brake pipe, of an application valve device operative upon an increase in brake pipe pressure to release the brakes, a reservoir normally charged with fluid under pressure from said brake pipe, and two valve devices operative upon an increase in brake pipe pressure in releasing the brakes for establishing communication through which fluid under pressure is supplied from said reservoir to said brake pipe, one of said valve devices being operative to control the operation of the other of said valve devices, to control the supply of fluid under pressure to the brake pipe.

10. In a fluid pressure brake, the combination with a brake pipe, of an application valve device operative upon an increase in brake pipe pressure to release the brakes, a reservoir normally charged with fluid under pressure from said brake pipe, two valve devices operative upon an increase in brake pipe pressure in releasing the brakes for establishing communication through which fluid under pressure is supplied from said reservoir to the brake pipe, one of said valve devices being operative to supply fluid to operate the other of said valve devices, and means for restricting the flow of fluid from one valve device to the other.

11. In a fluid pressure brake, the combination with a brake pipe and an auxiliary reservoir, of an application valve device subject to the opposing pressures of fluid in said auxiliary reservoir and brake pipe for effecting the application and release of the brakes, a supplemental reservoir for supplying fluid under pressure to said brake pipe in releasing the brakes, a quick action reservoir normally charged with fluid under pressure from said brake pipe, an emergency valve device subject to the opposing pressures of fluid in said brake pipe and quick action reservoir for effecting a predetermined reduction in the quick action reservoir pressure upon effecting an application of the brakes, and pressure sensitive means subject to the opposing pressures of fluid in said brake pipe and quick action reservoir in releasing the brakes for supplying fluid under pressure from said supplemental reservoir to the brake pipe.

12. In a fluid pressure brake, the combination with a brake pipe and an auxiliary reservoir, of an application valve device subject to the opposing pressures of fluid in said auxiliary reservoir and brake pipe for effecting the application and release of the brakes, a supplemental reservoir for supplying fluid under pressure to said brake pipe in releasing the brakes, a quick action reservoir normally charged with fluid under pressure from said brake pipe, an emergency valve device subject to the opposing pressures of fluid in said brake pipe and quick action reservoir for effecting a predetermined reduction in the quick action reservoir pressure upon effecting an application of the brakes, and valve means subject to the opposing pressures of fluid in said brake pipe and quick action reservoir in releasing the brakes for supplying fluid under pressure from said supplemental reservoir to the brake pipe.

13. In a fluid pressure brake, the combination with a brake pipe and an auxiliary reservoir, of a supplemental reservoir, means for charging said auxiliary reservoir and supplemental reservoir with fluid under pressure from said brake pipe, and two valve devices operated upon an increase in brake pipe pressure for controlling the supply of fluid under pressure from the supplemental reservoir to the brake pipe.

14. In a fluid pressure brake, the combination with a brake pipe and an auxiliary reservoir, of a supplemental reservoir, means for charging said auxiliary reservoir and supplemental reservoir with fluid under pressure from said brake pipe, and two valve devices operated upon an increase in brake pipe pressure for controlling the supply of fluid under pressure from the supplemental reservoir to the brake pipe, one of said valve devices being operative to control the operation of the other.

15. In a fluid pressure brake, the combination with a brake pipe and an auxiliary reservoir, of a supplemental reservoir, means for charging said auxiliary reservoir and supplemental reservoir with fluid under pressure from said brake pipe, a valve device adapted to be operated to supply fluid under pressure from said supplemental reservoir to said brake pipe, and a valve device operated upon an increase in brake pipe pressure for supplying fluid under pressure to operate the first mentioned valve device to supply fluid under pressure from the supplemental reservoir to said brake pipe.

16. In a fluid pressure brake, the combination with a brake pipe and an auxiliary reservoir, of a supplemental reservoir, means for charging said auxiliary reservoir and supplemental reservoir with fluid under pressure from said brake pipe, a valve device adapted to be operated to supply fluid under pressure from said supplemental reservoir to said brake pipe, and a valve device operated upon an increase in brake pipe pressure for supplying fluid under pressure from said brake pipe to operate the first mentioned valve device to supply fluid under pressure from the supplemental reservoir to said brake pipe.

17. In a fluid pressure brake, the combination with a brake pipe and an auxiliary reservoir, of a supplemental reservoir, means for charging said auxiliary reservoir and supplemental reservoir with fluid under pressure from said brake pipe, means for preventing the flow of fluid under pressure from said supplemental reservoir to said auxiliary reservoir, and two valve devices operated upon an increase in brake pipe pressure for supplying fluid under pressure from the supplemental reservoir to the brake pipe.

18. In a fluid pressure brake, the combination with a brake pipe and an auxiliary reservoir, of a supplemental reservoir, means for charging said auxiliary reservoir and supplemental reservoir with fluid under pressure from said brake pipe, a check valve for preventing the flow of fluid under pressure from said supplemental reservoir to said auxiliary reservoir, and two valve devices operated upon an increase in brake pipe pressure for supplying fluid under pressure from the supplemental reservoir to the brake pipe.

19. In a fluid pressure brake, the combination with a brake pipe, of two reservoirs normally charged with fluid under pressure from said brake pipe, a valve device operative upon a reduction in brake pipe pressure in effecting an application of the brakes for venting fluid under pressure from one of said reservoirs to atmosphere to reduce the pressure of fluid in said reservoir and operative when the pressure of fluid in said reservoir is reduced to substantially the pressure of fluid in said brake pipe for closing communication through which fluid under pressure from said reservoir flows to atmosphere and for establishing communication of the brake pipe with said reservoir, and means subject to the opposing pressures of said reservoir and brake pipe upon an increase in brake pipe pressure in releasing the brakes for supplying fluid under pressure from the other of said reservoirs to the brake pipe.

20. In a fluid pressure brake, the combination with a brake pipe, of two reservoirs normally charged with fluid under pressure from said brake pipe, a valve device operative upon a reduction in brake pipe pressure in effecting an application of the brakes for venting fluid under pressure from one of said reservoirs to atmosphere to reduce the pressure of fluid in said reservoir and operative when the pressure of fluid in said reservoir is reduced to substantially the pressure of fluid in said brake pipe for closing communication through which fluid under pressure from said reservoir flows to atmosphere and for establishing communication of the brake pipe with said reservoir, means subject to the opposing pressures of said reservoir and brake pipe upon an increase in brake pipe pressure in releasing the brakes for supplying fluid under pressure from the other of said reservoirs to the brake pipe, and means restricting the flow of fluid to said reservoir when the pressure of fluid in the brake pipe is increased.

21. In a fluid pressure brake, the combination with a brake pipe, of a plurality of reservoirs normally charged with fluid under pressure from said brake pipe, a valve device operative to establish communication through which fluid under pressure is supplied from one of said reservoirs to said brake pipe in releasing the brakes, a valve device operative upon a reduction in brake pipe pressure in effecting an application of the brakes for reducing the pressure of fluid in another of said reservoirs, and a valve device subject to the reduced pressure in the last mentioned reservoir and an increased brake pipe pressure in releasing the brakes for controlling the operation of the first mentioned valve device to supply fluid under pressure from the first mentioned reservoir to the brake pipe.

22. In a fluid pressure brake, the combination with a brake pipe and an auxiliary reservoir, of an application valve device operative upon a reduction in brake pipe pressure for effecting an application of the brakes and operative upon an increase in brake pipe pressure for releasing the brakes, a supplemental reservoir normally charged with fluid under pressure from the brake pipe, a quick action reservoir, an emergency valve device having a position for supplying fluid under pressure from said brake pipe to said quick action reservoir and operative upon a reduction in brake pipe pressure for closing off the supply of fluid under pressure from the brake pipe to said quick action reservoir and for establishing communication through which fluid under pressure from said quick action reservoir is vented to the atmosphere and operative when the pressure in said quick action reservoir is reduced to brake pipe pressure for closing off said communication and for reestablishing communication of said brake pipe with said quick action reservoir, and means subject to the reduced quick action reservoir pressure and increased brake pipe pressure in releasing the brakes for supplying fluid under pressure from said supplemental reservoir to the brake pipe.

23. In a fluid pressure brake, the combination with a brake pipe and an auxiliary reservoir, of a supplemental reservoir charged with fluid under pressure, a quick action chamber, and a valve device subject to the opposing pressures of the brake pipe and the quick action chamber and operated upon an increase in brake pipe pressure for effecting the supply of fluid under pressure from the supplemental reservoir to the brake pipe.

24. In a fluid pressure brake, the combination with a brake pipe, of a quick action chamber, a valve device subject to the opposing pressures of the brake pipe and said chamber and operated upon a sudden reduction in brake pipe pressure for effecting an emergency application of the brakes, and a quick release valve device subject to the opposing pressures of the brake pipe and said quick action chamber and operated upon an increase in brake pipe pressure for effecting the supply of fluid under pressure to the brake pipe.

UNCAS A. WHITAKER.